United States Patent [19]

Inoue

[11] 4,348,622
[45] Sep. 7, 1982

[54] DC MOTOR DRIVE CONTROL SYSTEM
[75] Inventor: Kiyoshi Inoue, Tokyo, Japan
[73] Assignee: Inoue-Japax Research Incorporated, Yokohama, Japan
[21] Appl. No.: 52,780
[22] Filed: Jun. 28, 1979
[30] Foreign Application Priority Data
  Jul. 1, 1978 [JP] Japan .................................. 53-80198
  Oct. 24, 1978 [JP] Japan ................................ 53-131381
[51] Int. Cl.³ .............................................. H02P 5/16
[52] U.S. Cl. ..................................... 318/318; 318/314
[58] Field of Search ............... 318/314, 318, 341, 608, 318/329, 601, 603

[56] References Cited
U.S. PATENT DOCUMENTS

| | | | |
|---|---|---|---|
| 3,110,853 | 11/1963 | Jones | 318/314 |
| 3,361,949 | 1/1968 | Brown et al. | 318/314 |
| 3,386,021 | 5/1968 | Fischer | 318/329 |
| 3,828,168 | 8/1974 | O'Callaghan et al. | 318/615 |
| 3,836,756 | 9/1974 | Yamomoto et al. | 318/608 |
| 3,896,358 | 7/1975 | Tanikoshi | 318/314 |
| 4,004,205 | 1/1977 | Yamamoto et al. | 318/329 |
| 4,215,301 | 7/1980 | Mason | 318/601 |
| 4,219,765 | 8/1980 | Morsing | 318/619 |

FOREIGN PATENT DOCUMENTS
1472115 4/1977 United Kingdom .

Primary Examiner—David Smith, Jr.
Attorney, Agent, or Firm—Karl F. Ross

[57] ABSTRACT

A DC motor drive-control system with a driver circuit for energizing the DC motor receiving a command signal to the driver circuit to cause the motor to rotate in accordance therewith. An encoder is coupled with the DC motor so as to respond to an angular displacement thereof for providing a first sensing signal representing an angular position of the DC motor and a second sensing signal representing an angular velocity thereof. A processor circuit is responsive to the command signal and the first and second sensing signals to produce a control drive signal and to apply it to the driver circuit so that the motor is driven controlledly as to its angular position and velocity.

7 Claims, 4 Drawing Figures

DC MOTOR DRIVE CONTROL SYSTEM

FIELD OF THE INVENTION

The present invention relates to a direct-current (DC) motor drive-control system and, more specifically, to a drive control system for a DC motor operating in an analog mode.

PRIOR ART

Conventional systems designed to control the rotation of a DC motor make use of an encoder, i.e., a rotary encoder. Such systems have, however, been capable of regulating only the angular position or displacement and incapable of controlling the angular velocity as well. Consequently, in order to be controllable as to velocity as well, the prior arrangements must be equipped with a rate generator additionally directly coupled to the DC motor so that signals generated therein can be fed back to the driver circuit. This additional provision of a rate generator is disadvantageous in that it renders the system undesirably bulky, complex and costly.

OBJECTS OF THE INVENTION

It is, accordingly, an object of the present invention to provide a DC motor drive-control system which eliminates the use of a rate generator.

Another object of the invention is to provide a drive control system which permits the DC motor to rotate with a rapid control response and stability in accordance with input command signals.

A further object of the invention is to provide a control system which is capable of terminating rotation of the DC motor extremely accurately at a commanded rotatory position.

Still further object of the invention is to provide a DC motor drive-control system which is simple to maintain and check or is substantially trouble-free.

SUMMARY OF THE INVENTION

The invention is characterized by elimination of the rate generator and features the use of single sensing means or encoder, i.e. a rotary encoder coupled in a sensing relationship with the DC motor for providing both "position" and "velocity" feedback signals to control rotation or angular displacement with precision and stability in accordance with an input command signal.

In accordance with the present invention, there is provided a drive-control system for a direct-current (DC) motor, which comprises a driver circuit for energizing the DC motor: a command source for applying an input command signal to the driver circuit to cause the DC motor to rotate in accordance therewith; an encoder coupled with the DC motor so as to respond to angular displacement thereof for providing a first sensing signal representing an angular position of the DC motor and a second sensing signal representing an angular velocity of the DC motor; and processor circuit means responsive to the input command signal and the first and second sensing signals to produce a control drive signal and to apply it to the driver circuit so that the DC motor is driven controlledly as to its angular position and velocity.

In accordance with a more specific aspect of the invention, the encoder provides the sensing signal in the form of pulses representing the angular displacement of the DC motor and the command source provides the input command signal in the form of pulses the number of which represents rotary displacement of the DC motor. The input and sensing signals may be applied to a comparator circuit, e.g. a differential counter, which provides a position drive signal. The sening signal outputted by the encoder may also be applied to a frequency voltage converter for producing a voltage signal representing the angular velocity of the DC motor. The position-drive signal transformed into an analog signal and the velocity voltage signal may be combined at an analog comparator, e.g. a differential amplifier, which produces a comparison signal. The latter upon conversion to a frequency signal may then be applied to an operational or power amplifier in the driver circuit to allow the DC motor to be drive-controlled as to its angular position and velocity. The operational or power amplifier has an additional input fed by a sign generator which, in response to an output signal from the command source, provides a sign signal indicating the direction in which the DC motor is to be driven.

In an alternative embodiment of the invention, the command source may provide both a position and velocity command signals which are combined with a sensing position and velocity signals from the encoder, respectively, at distinct comparator circuits, e.g., differential counters. The output of the position signal comparator upon conversion to an appropriate analog value is applied to the driver circuit so that the motor may be driven precisely until it reaches the commanded position. The voltage comparison signal is likewise converted into a corresponding analog signal which is applied to a current regulating element, e.g. a transistor, in the driver circuit to control the magnitude of a drive current energizing the DC motor, thereby controlling the rate of rotation or velocity of the DC motor.

BRIEF DESCRIPTION OF THE DRAWING

The foregoing and other objects, features and advantages of the invention will become more readily apparent from the following description of certain embodiments of the invention as illustrated in the accompanying drawing. In the drawing.

SPECIFIC DESCRIPTION

Figure 1:
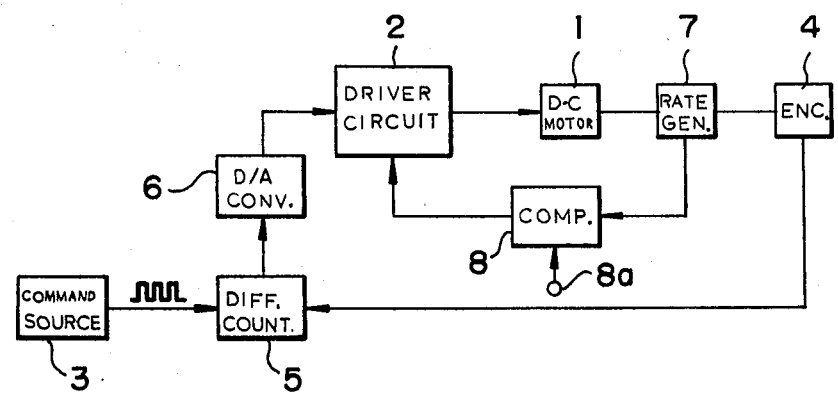
FIG. 1 is a block diagram of a conventional drive-control system for a DC motor.

In FIG. 1 there is shown a conventional drive-control system applied to a DC motor 1 energized by a driver circuit 2. The input to the driver circuit 2 includes a command source 3 and the DC motor has an encoder 4 coupled thereto so that the source 3 and a feedback signal from the encoder 4 are combined at a differential counter 5. The latter thus provide differentiated digital pulses which are converted by a D-A (digital-analog) converter 6 into an analog signal for application to drive circuit 2 to continuously rotate the DC motor 2 until a commanded angular position is reached. In order to control the DC motor 2 as to its velocity as well, a rate generator 7 is additionally directly coupled to the DC motor to sense a velocity signal which is compared with a reference level set at an input of 8a a control circuit 8 to apply the resulting differential velocity command signal to the driver circuit 2. As noted previously, provision of the rate generator 7 renders the system undesirably bulky, complex and expensive.

Figure 2:
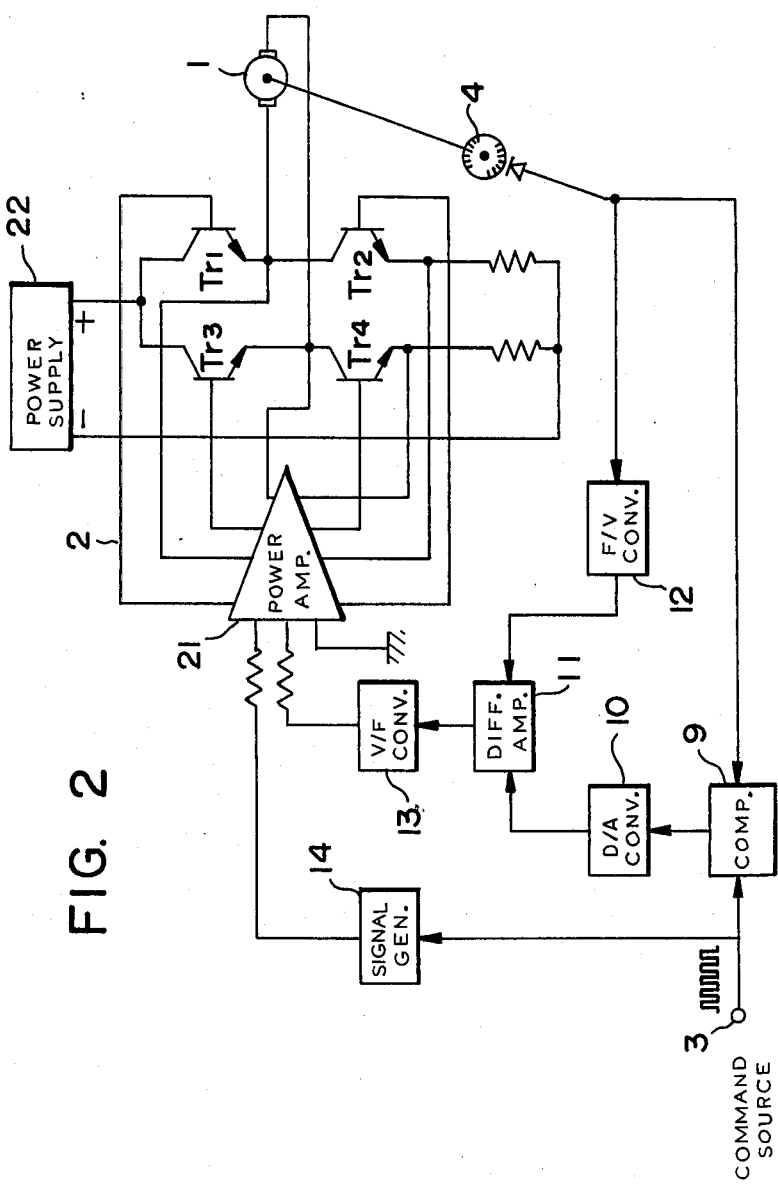
FIG. 2 is a schematic diagram of an embodiment of the DC motor drive-control system according to the present invention.

In FIG. 2 there is shown a DC motor drive control system of the present invention which as in the prior system as described operates in response to drive signals from the command source 3 and includes the encoder 4 coupled to the DC motor 1 controlled by the driver circuit 2. The command signal is a pulse train and the source 3 may comprise a register for memorizing and producing the pulse train from the readout of drive information stored on a record medium, a ROM (read-only-memory) assembly for memorizing and selectively regenerating the pulse train or a signal processor coupled with an electrical machining gap to produce the pulse train representing the machining gap condition.

A signal comparator 9 is provided which receives on one hand the input signal from the command source 3 and on the other hand a position sensing signal provided by the encoder 4 to produce an output position drive signal upon comparing the input and sensing signals. The comparator 9 may be a differential counter. A D-A (digital-analog) converter 10 converts the digital position drive signal from the processor 9 into a corresponding analog, from which is applied to a differential control or comparator circuit 11 that may be a differential amplifier.

In accordance with the present invention, the encoder 4 is adapted to produce not only the position feedback signal to the processor 9 but also a velocity feedback signal, the latter in this embodiment being applied via a FV (frequency voltage) converter 12 to the differential control or comparator circuit 11 which may be a differential amplifier. The FV converter 12 transforms a digital velocity signal, i.e. a number of pulses per unit time or frequency, detected at the encoder 4 in response to rotation of the motor 1 into an analog signal represented in voltage. Accordingly, a differentiated analog signal as a result of comparison of the position drive signal and the velocity signal is issued from the control or processor circuit 11. A V-F (voltage-frequency) converter 13 is provided which converts the differentiated analog signal into corresponding frequency pulses which are in turn applied to the driver circuit 2 at its first input. The second input of the driver circuit 2 is fed with a sign generator 14 which discriminates between two signs (+, −) of the command signal outcoming from the command source 3 to apply a corresponding signal to the driver circuit 2. The driver circuit is shown comprising an operational or power amplifier 21 fabricated in an integrated circuit module, a power supply 22 and transistor switches Tr1, Tr2, Tr3 and Tr4 selectively energized in pair (Tr1+Tr4, Tr2+Tr3) to energize the DC motor 1 to cause it to rotate in one of the positive and negative angular directions.

In operation, the motor 1 is rotated under control by switches Tr1, Tr2, Tr3 and Tr4 either pair of which Tr1 and Tr4 or Tr2 and Tr4 is alternately turned on and off depending on the direction in which it is to be rotated. The angular displacement of motor 1 is detected by the encoder 4 producing pulses corresponding to the angular displacement effected. The encoder 4 provides a position signal in the form of the number of pulses produced and a velocity signal which is represented by the number of pulses per unit time. The comparator circuit 9 receives the position command signal in the form of a pulse train from the source 3 and also from the encoder 4 a pulse train representing the detected position signal and processes the two signals to provide an output signal which represents a position drive signal in the form of digital pulses. The latter pulses are converted by the D-A converter 10 into a corresponding analog signal in the form of voltage magnitude. On the other hand, the F-V converter 12 converts the detected pulse frequency at the encoder into a proportional voltage signal. The two voltage signals are applied to the differential control circuit or comparator 11 and are compared therein with one another to result in a differential signal.

Let it be assumed that a command signal is now applied to the system from the command source 3 to cause the motor 1 to perform a predetermined angular displacement. In the initial stage in which the signal is inputted, the rate of rotation detected by the encoder 4 is still so small that the velocity signal transmitted to the differentiator 11 from the F-V converter 12 is much smaller than the signal that it receives from the D-A converter 10. As a consequence, a large differential signal is produced by the differentiator 11 and results in digital pulses of an increased frequency at the output of the V-F converter 13 or the input of the driver circuit 2. In the latter, with the switches Tr1 and Tr4 selectively placed under switching control (and Tr2 and Tr3 deactuated), these switches are turned on and off to energize the motor 1 with a current flowing from power supply 22, switch Tr1, motor 1, switch Tr4 and back up to the supply 22 pulsed at that increased frequency. Thus, the rate of rotation or velocity of the motor 1 which is proportional to the frequency at which the switches are turned on is controlled so as to be increased in the initial stage of a predetermined displacement.

As the rate of rotation increases, the encoder 4 output applied to the differentiator 11 and accordingly the F-V converter 13 output applied to the driver circuit 2 decreases so that the frequency of drive pulses energizing the motor 1 are reduced. This continues until the commanded displacement by the motor 1 is completed upon completion of command drive pulses so that the motor 1 comes to stop.

The sign discriminator 14 judges, from the signal incoming from the command source 3, the direction in which the motor 1 is instructed to be driven and produces an appropriate signal which selectively activates the pair of transistors Tr1 and Tr4 and the pair of transistors Tr2 and Tr3 for control to rotate the motor 1 in the positive and negative directions, respectively.

The processor or logic circuit 9 continues to output position drive pulses to continue to rotate the motor 1 until the position command signal and the encoder 4 output signal coincide with each other or become equal. Completion of the predetermined displacement commanded is detected by the encoder 4 which produces a corresponding signal which is compared with the command signal. Coincidence between the two terminates the operation of driver circuit 2 to halt the rotation of the motor 1. The sign judgement of the command signal provides determination of the drive direction so that for every block of command an angular displacement of the motor over a commanded distance in a commanded direction is effected.

The comparison of the position drive signal in accordance with the command with the velocity signal and the use of their differential to control the drive circuit 2 operating the motor 1 have advantages. Thus, an overtravel is effectively prevented and positioning is achieved with extreme accuracy and promptness due to an acceleration of drive in the initial state and its continuous deceleration thereafter which are achieved by a proportional frequency control of drive pulses.

Figure 3:
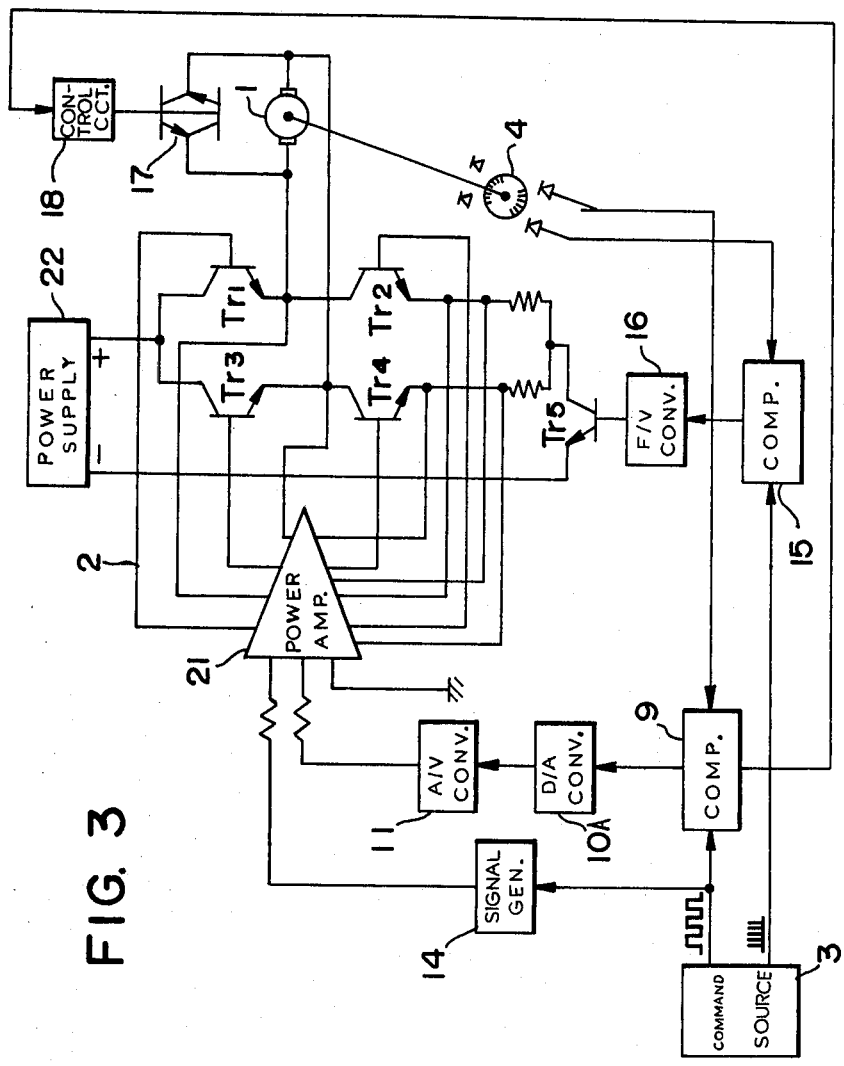
FIG. 3 is a similar diagram of another embodiment of the DC motor drive-control system of the present invention.

In an embodiment illustrated in FIG. 3, the command source 3 provides both a position command signal and a velocity command signal. The position command signal is again applied to a comparator circuit 9 adapted to receive the position feedback signal from the encoder 4. The comparator circuit 9 which may again be a differential counter thus outputs differentiated digital pulses which are transformed by the D-A converter 10 to a corresponding analog signal. The latter is modified in an A-V converter 11 to result in an appropriate continuous signal which is applied to an operational or power amplifier 21 in the drive circuit. The amplifier has a second input fed by the sign generator 14 and a third input which is grounded as in the previous embodiment.

The velocity command signal is applied from the source 3 to a comparator circuit 15 adapted to receive the velocity feedback signal from the encoder 4. The comparator circuit 15, which may again be a differential counter, thus outputs a differentiated velocity drive signal in the form of digital pulses or frequency signal which is transformed by a F-V converter 16 into a voltage signal which is applied to a current-control transistor Tr5 provided additionally in the drive circuit 2, the latter being basically identical to that of the previous embodiment. In this embodiment, a further switch 17 is connected in parallel with the motor 1 as energized by a control circuit 18 leading from the comparator logic circuit 9 to assure a precise positioning of the motor as it is brought to a stop.

In the driver circuit 2, transistors Tr1 and Tr4 are operated in unison to energize the motor 1 to cause it to rotate in the positive direction. Likewise, transistors Tr2 and Tr3 are actuated in unison to energize the motor 1 to cause it to rotate in the negative direction. As in the previous embodiment, the processor or logic circuit 9 continues to provide a position drive signal to have the motor 1 continuously rotated by the driver circuit 2 until the position command signal from the source 3 and the detected position signal coincide with each other or become equal.

in each block of positioning command, the source 3 simultaneously provides velocity signal represented by the number of clock pulses per unit time which is compared at the comparator circuit 15 with the detected velocity signal coming from the rotary encoder 4. The encoder 4 provides a pulse train whose frequency is proportional to the rate of rotation of the motor 1 caused. The processor 15 thus provides the velocity drive signal or frequency output which upon conversion into the corresponding voltage signal at the F-V converter 16 is applied to the transistor Tr5.

The motor 1 is driven initially at a low velocity. In this state, the velocity signal detected by the encoder 4 is smaller than the command velocity signal so that a greater frequency signal is generated by the comparator circuit 15 and a greater voltage signal applied to the transistor Tr5. The latter has thus its effective resistance reduced to permit a drive current of increased magnitude to be passed therethrough and through the motor 1 to raise its rate of rotation. This continues until a predetermined rate of rotation is reached, when the frequency signal levels down to a given value and the transistor Tr5 has consequently its resistance increased to reduce the drive current to a given level to cause it to rotate at a constant velocity.

When the position drive signal from the processor 9 becomes nil to bring the motor to stop, not only is the operation of the driver circuit 2 terminated but an additional control is effected in this embodiment by means of the transistor switch 17 which is turned on to shunt the motor 1 circuit to ensure a prompt stoppage of the motor. In this state, the processor 9 transmits a stop signal to the control circuit 18 which in turn renders the switch 17 conductive. This arrangement is especially advantageous when the motor 1 has a large torque due to external load.

Figure 4:
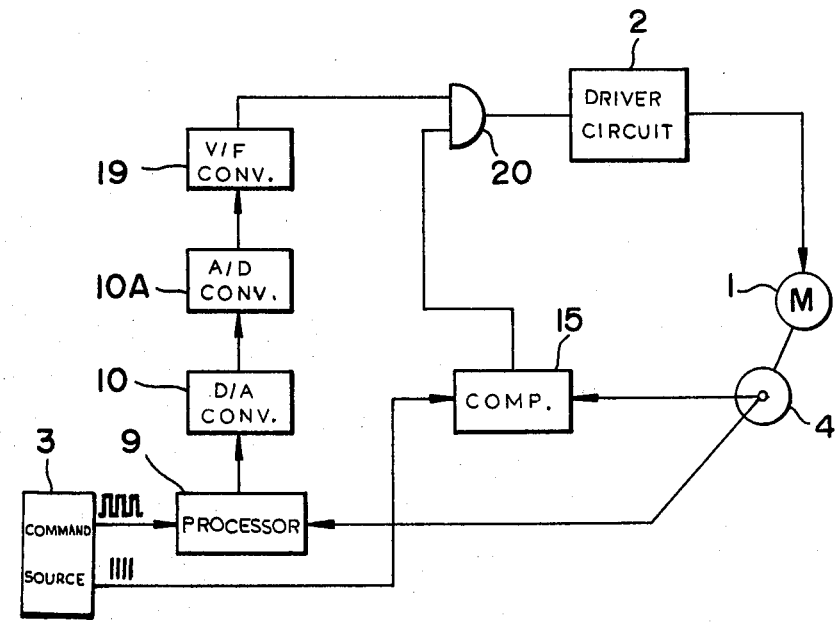
FIG. 4 is a block diagram illustrating a further embodiment of the present invention.

In FIG. 4 there is shown a modification of the embodiment just described in which the position drive signal from the processor 9 is applied via the D-A converter 10 and the A-D converter 10A to a V-F converter 19 which in turn feeds into the first input of an AND gate 20 arranged to the input of the driver circuit 2. The AND gate 20 has a second input fed with the velocity drive signal coming from the comparator circuit 15. Thus, in this embodiment, frequency-modulated signal pulses are applied to the driver circuit 2 to attain control both as regards both the position and velocity of the motor 1.

In the foregoing description, it should be noted that the encoder 4 may be of optical, electromagnetic or any other appropriate type. Comparator circuits 9 and 15 may be a differential counter, digital comparator, preset counter or up-down counter. They may be constructed to be settable by a command signal from the source 3 to initiate counting signal pulses from the encoder 4. The encoder output may be differentiated and then integrated with a time-constant network to produce a directly converted velocity signal.

What is claimed is:

1. A DC motor drive control system, comprising:
   a driver circuit for energizing a DC motor;
   a command source for applying an input command signal comprising a first pulse train to said driver circuit to cause said motor to rotate in accordance therewith;
   single encoder means coupled with said DC motor so as to respond to an angular displacement thereof for providing a first sensing signal comprising a second pulse train and representing an angular position of said DC motor and a second sensing signal representing an angular velocity thereof; and
   processor circuit means responsive to said input command signal and said first and second sensing signals to produce a control drive signal and to apply it to said driver circuit so that said motor is driven controlledly as to its position and velocity, said processor circuit means including:
   (a) a first comparator responsive to said input command signal from said command source and to said first sensing signal from said encoder means to provide a position drive signal, said first comparator comprising a differential counter responsive to said first and second pulse trains to produce differentiated digital pulses;
   (b) a digital-analog converter connected to said first comparator for converting said digital pulses to an analog signal;
   (c) a frequency-voltage converter responsive to said second pulse train to produce a voltage signal representing the frequency thereof;

(d) a differential amplifier constituting a second comparator and responsive to said analog signal and said voltage signal to produce a differentiated voltage signal; and (e) a voltage-frequency converter for transforming said differentiated voltage signal to a third pulse train constituting said control drive signal.

2. The system defined in claim 1 wherein said processor circuit means further comprises:

(f) a sign generator responsive to said command source for selectively providing one of plus and minus signs in accordance with said input command signal, and said driver circuit includes:

a first pair of semiconductor switches adapted to pass an energizing current through said DC motor in a positive direction to rotate the same in a positive angular direction and a second pair of semiconductor switches adapted to pass the energizing current through said DC motor in a negative direction to rotate the same in a negative angular direction, and said first and second pairs of semiconductor switches being selectively actuated in response to said plus and minus signs, respectively.

3. A DC motor drive control system, comprising:

a driver circuit for energizing a DC motor;

a command source for applying an input command signal comprising a first pulse train to said driver circuit to cause said motor to rotate in accordance therewith;

single encoder means coupled with said DC motor so as to respond to an angular displacement thereof for providing a first sensing signal comprising a second pulse train and representing an angular position of said DC motor and a second sensing signal representing an angular velocity thereof;

processor circuit means responsive to said input command signal and said first and second sensing signals to produce a control drive signal and to apply it to said driver circuit so that said motor is driven controlledly as to its position and velocity, said processor circuit means including:

(a) a first comparator responsive to said input command signal from said command source and to said first sensing signal from said encoder means to provide a position drive signal, said first comparator including a differential counter responsive to said first and second pulse trains to produce differentiated digital pulses of a first class;

(b) a digital-analog converter for converting said differentiated digital pulses of the first class into an analog signal;

(c) an analog-digital converter for transforming said analog signal into a digital position signal constituting a first portion of said control drive signal;

(d) a second comparator responsive to said input command signal and said second sensing signal from said encoder means to provide a velocity signal and including a second differential counter for providing differentiated digital pulses of a second class; and (e) a second digital-analog converter for converting said differentiated digital pulses of the second class into a second analog signal constituting a second portion of said control driving signal.

4. The system defined in claim 3 wherein said driver circuit includes an operational or power amplifier responsive to said position signal and a current-regulating element responsive to said velocity signal for controlling the magnitude of drive current for energizing said DC motor.

5. The system defined in claim 4, wherein said processor circuit means further includes a sign discriminator responsive to said command source for providing one of positive and negative sign signals and applying them to said operational or power amplifier.

6. A DC motor drive control system, comprising:

a driver circuit for energizing a DC motor;

a command source for applying an input command signal comprising a first pulse train to said driver circuit to cause said motor to rotate in accordance therewith;

single encoder means coupled with said DC motor so as to respond to an angular displacement thereof for providing a first sensing signal comprising a second pulse train and representing an angular position of said DC motor and a second sensing signal representing an angular velocity thereof;

processor circuit means responsive to said input command signal and said first and second sensing signals to produce a control drive signal and to apply it to said driver circuit so that said motor is driven controlledly as to its position and velocity, said processor circuit means including:

(a) a first comparator responsive to said input command signal from said command source and to said first sensing signal from said decoder means to provide a position driver signal, said first comparator including a differential counter responsive to said first and second pulse trains to produce differentiated digital pulses of a first class;

(b) a digital-analog converter for converting said differentiated digital pulses of the first class into an analog signal;

(c) an analog-digital converter for transforming said analog signal into further digital pulses;

(d) a frequency-voltage converter for converting the frequency of said further digital pulses into a voltage signal constituting a first portion of said control drive signal;

(e) a second comparator responsive to said input command signal and said second sensing signal from said encoder means to provide a velocity signal and including a second differential counter for providing differentiated digital pulses of a second class, constituting a second portion of said control driver signal.

7. The system defined in claim 1, claim 2, claim 3, claim 4, claim 5, or claim 6, further comprising switch means connected in parallel with said DC motor adapted to be turned on at the termination of said input command signal to shunt the energizing current for said motor therethrough.

* * * * *